United States Patent [19]

Fledges et al.

[11] 3,964,853

[45] June 22, 1976

[54] APPARATUS FOR LOADING MULTI-STAGE HEATING PRESSES

[75] Inventors: Werner Fledges; Peter van Hullen, both of Krefeld, Germany

[73] Assignee: Becker & van Hüllen Niederrheinische Maschinenfabrik, Krefeld, Germany

[22] Filed: Nov. 13, 1974

[21] Appl. No.: 523,312

[52] U.S. Cl. .................................. 425/338; 100/196; 214/1 B; 425/406; 425/436 RM

[51] Int. Cl.² .......................................... B29C 3/00

[58] Field of Search .. 425/338, 406, 455, DIG. 200, 425/DIG. 201, 436 RM; 100/196; 214/1 B

[56] References Cited

UNITED STATES PATENTS

| | | | |
|---|---|---|---|
| 3,173,976 | 3/1965 | Paerels et al. | 425/DIG. 201 |
| 3,611,482 | 10/1971 | Hutz | 425/130 |
| 3,824,058 | 7/1974 | Axer et al. | 425/130 X |

*Primary Examiner*—Robert L. Spicer, Jr.
*Attorney, Agent, or Firm*—Herbert E. Kidder

[57] ABSTRACT

The present invention provides a device for the charging of presses, particularly multiple-opening platen hot moulding presses, having drawing members for flexible transport supports carrying material to be moulded, said transport supports being in a feed basket in front of the press, characterized in that continuously rotating drawing means are provided as drawing members for the transport supports in the press platens.

5 Claims, 3 Drawing Figures

APPARATUS FOR LOADING MULTI-STAGE HEATING PRESSES

The present invention relates to a device for the charging of presses, particularly multiple-opening platen hot-moulding presses.

The charging of this kind of multiple-opening platen presses in such a way that a feed basket, which can be raised and lowered and the platens of which are fitted with movable pallets, are arranged in front of the press is known.

Flexible transport supports with the material to be moulded placed thereon, for example, a swarf fleece, are mounted on the pallets in tier arrangement.

As soon as the feed basket is completely filled it is placed in a position in which its platens are on the same level as the press platens of the open hot-moulding press. The pallets with the flexible transport supports thereon and the material to be moulded are then slipped into the open press. As soon as the pallets are completely in the press, the flexible transport supports are stopped at the discharge end of the press by a gripping device relative to the press and the pallets are drawn from under the flexible transport support and returned into the feed basket. The transport supports are gradually deposited on the press platens.

This conventional manner of charging has considerable disadvantages. Upon withdrawing the pallets the transport supports run off the pallets on an S-shaped path, and come to rest on the press platens. The material to be pressed will thus be compressed and elongated on both its upper side and its underside. This can result in damage. Moreover, the periods of standstill of the hot-moulding press are extended by the withdrawal of the pallets. The entire charging operation must be carried out within a working cycle, i.e., the unit of time in which a press platens is produced or othrwise the continuous operation of the entire plant is disturbed. Since the pallets must carry out an up-and-down stroke in the period of the cycle, this can result in difficulties in case of short cycle periods because of the high pallet speed, thus required. Another disadvantage lies in that the opening of the press between the individual press platens must be enlarged by the amount of the pallet thickness since, on account of its relatively great thickness, the material to be moulded cannot be brought into the press.

It is also known to draw or push the press supports into the press with the aid of reciprocating drawing members, which are disposed either on the feed end or on the discharge end, without carrying the pallets into the press. In fact, this kind of charging does not have the disadvantage that the transport supports are deposited in the form of an S, but, now as before, an up-and-down stroke of the drawing members is required.

Therefore, it is the aim of the invention to create a device for the charging of presses, i.e., a device in which compression and elongation of the material to be moulded is absolutely impossible and, moreover, in which no difficulties are encountered in the time for brining in the press supports with the material to be moulded, within the cycle periods of the entire plant.

In order to solve this problem, a device for the charging of presses, particularly multiple-opening platen hot-moulding presses, is proposed, i.e., a device having drawing members for flexible transport supports, which carry the material to be moulded, for example, a swarf fleece. Said flexible transport supports are in a feed basket in front of the press. Drawing means which continuously rotate in the press platens are provided as drawing members for the transport supports. These drawing means consist preferably of chains. Moreover, in order to assure exact and uniform drawing, the chains must be installed on two opposed sides, i.e., as seen in the operating direction, on the longitudinal sides of the press platens. According to the invention the drives for the drawing means are arranged on the discharge end of the press, said drives being so arranged that they are staggered like tiers alternatingly on the right and on the left. Moreover, the drawing means rotate preferably in grooves within the press platens. In the region of the drawing means towards the projected area the grooves are covered with cover plates. This largely prevents the drawing means from getting soiled.

According to a further feature of the invention the drawing means carry tow pins, which an be thrown into gear with tow strips of the transport supports. The tow pins are suitably designed as pins projecting from the grooves laterally with respect to the cover plates. However, the tow strips are attached preferably to the leading edges of the transport supports and project slightly beyond the longitudinal sides so that they can be engaged, without difficulties, by the towing pins of the rotating drawing means. In order to assure satisfactory drawing of the transport supports from the pallets the invention also provides that press platens have, on their front ends, ramps for the pallets. Said ramps are staggered with respect to the surface of the pallets by the thickness of the pallets. The ramps are preferably tapered along their leading edges so that the pallets can easily slide on. Moreover, it is very suitable to design the ramps as several lugs arranged side by side.

Finally, according to the invention the pallets can be arranged in a feed basket having a separate feed drive. This makes it possible for the pallets to drive up to the press platens in a simple manner so as to be flush and on the same level therewith. The feed drives consist preferably of hydraulic or pneumatic feed cylinders, which are hinged to the feed basket.

The invention is described in greater detail by means of a practical example with reference to the drawings.

Figure 1:
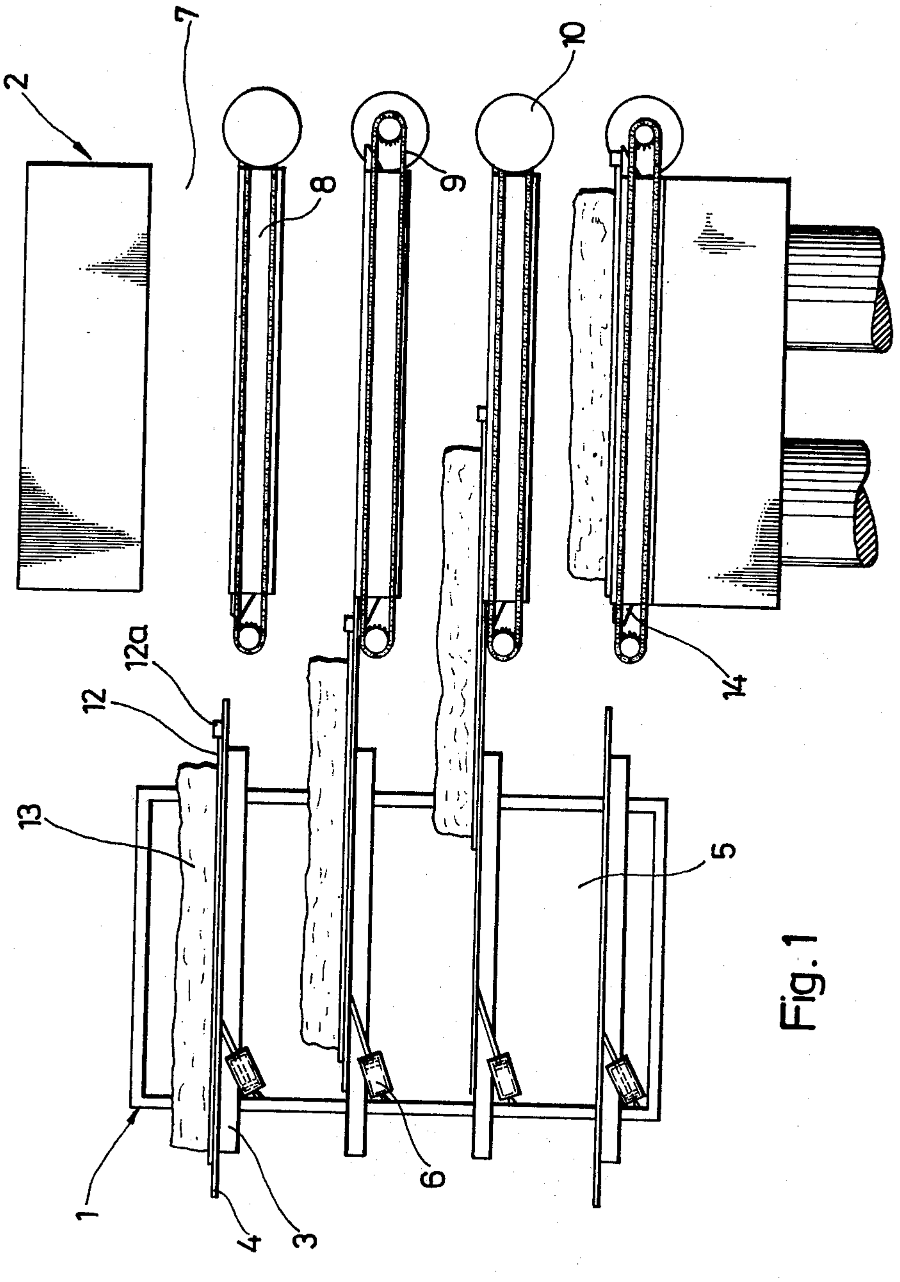
FIG. 1 shows a diagrammatic representation of the feed basket and of the press in lateral view.
Figure 2:
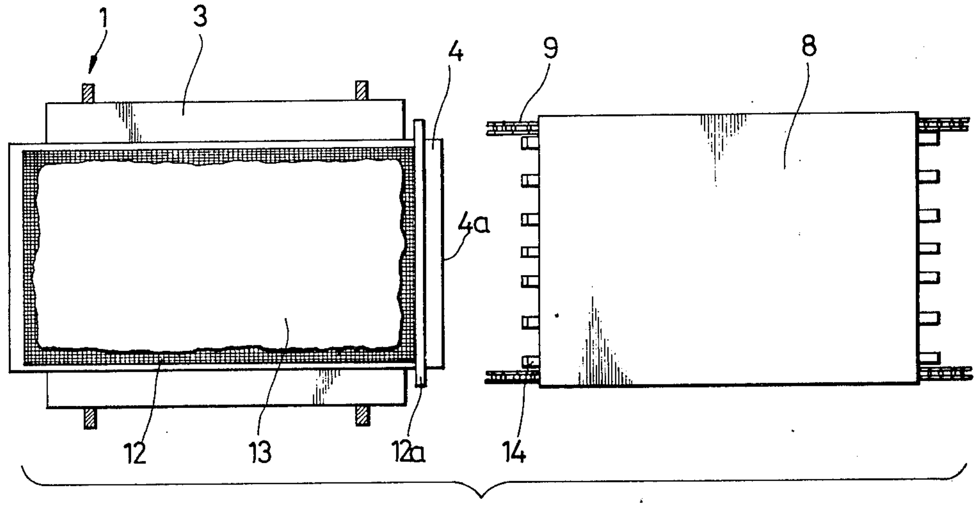
FIG. 2 shows a diagrammatic representation of a section through the feed basket and the press in plan view.

A feed basket 1, which can be raised and lowered, and a multiple-opening platen (hot-moulding) press are shown in FIG. 1 and 2. The feed basket 1 carries platen shelves 3 and movable pallets 4 are lying thereon. The platens of the feed basket 1 have the reference number 5. A feed cylinder 6, which is hinged to the feed basket 1 and to the pallet 4 (not shown in detail), is assigned to each individual pallet 4.

Figure 3:
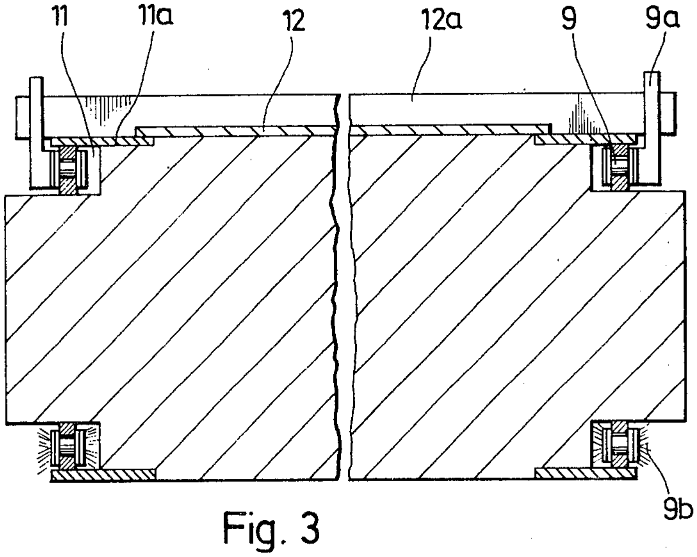
FIG. 3 shows a section through a press platen on an enlarged scale.

In the practical example the multiple-opening platen press 2 is provided with four moulding spaces 7 so that there are three press platens in all. Each of the press platens 8 has revolving chains 9 provided on the right- and left-hand sides thereof, as viewed along the direction of travel (see FIG. 3). Each chain 9 has a drive 10. Said drives 10 are so arranged that they are staggered from opening 7 to opening 7 so that sufficient daylight is available when the press 2 is completely closed. Moreover, the chains 9 rotate in grooves or recesses 11, which are provided on the upper side and underside of each caul 8, as is evident from FIG. 3. Further, in the region of the chains 9 the grooves 11 are covered with cover plates 11*a*, which are screwed to the press platens 8. Tow pins 9a project from the grooves 11 laterally with respect to the cover plates 11*a*. Said tow pins 9*a* are laterally secured to the chains 9 so that they jut out laterally with respect to the groove 11 and pass along the cover plates 11a projecting thereabove.

The chains 9 also carry brushes 9*b*, which clean the grooves 11 when said chains 9 are rotating.

The function of the device is evident substantially from FIG. 1, in which various operating positions are shown in the individual platens 5 and in the moulding spaces 7. The initial position is shown in the upper platen 5 of the feed basket 1 and in the upper moulding space 7 of the press 2. The feed basket 1 is filled with flexible transport supports 12, which carry the material 13 to be moulded. On the other end the press 2 is emptied in a known manner by a drawing device (not shown). The pallets 4 with the flexible transport supports 12 carrying material 13 to be moulded are moved towards the press 2 by the feed cylinder 6 so that they so rest with their leading edges 4*a* against the press platens 8 that they are flush and on the same level therewith and that the transport supports 12 with their tow strips 12a are in the towing region of the chains 9 admitted and rotating in the press platens 8. In order that the pallets 4 come to rest against the press platens 8 in such a way that they are flush and on the same level therewith, tapered ramps 14, which are offset downwards with respect to the surface of the press platens 8 by the thickness of the pallet 4, are attached to the press platens 8. A separate feed cylinder 6 is assigned to each individual pallet 4 so that, in the advanced state, the pallets 4 take into account the variable position of the press platens 8 which is due to their guide clearance. This position is shown in the second platen 5 of the feed basket 1 from above and in the corresponding moulding space 7. The chains 9, which rotate in the press platens 8, grip with their towing pins 9*a* the towing strips 12*a*, which are attached to the leading edges of the flexible transport supports 12 and are jutting out beyond the lateral edges on both sides. As the chains continue to rotate, the transport supports 12 carrying the material 13 to be moulded, are drawn into the press 2, as shown in the third platen 5 of the feed basket 1 from above and in the corresponding moulding space 7. As soon as the flexible transport supports 12 carrying the material 13 to be moulded have completely passed from the feed basket 1 into the press 2 the pallets 4 are withdrawn by the feed cylinder 6 and returned to the feed basket 1. The press 2 is now charged and can be closed. This position is shown in the lower platen 5 of the feed basket 1 and in the lower moulding space 7.

The embodiments of the invention in which an exclusive property or privilege is claimed are defined as follows:

1. Apparatus for charging a multiple-opening hot-moulding press having a plurality of vertically spaced platens, and having an entrance side and an exit side, comprising:

a feed basket located on the entrance side of the press, said feed basket having a plurality of horizontal shelves corresponding in number with the press platens, said shelves being substantially in horizontal register with their respective press platens;

a pallet slidably supported on each of said shelves;

a flexible transport support resting on each of said pallets, said flexible transport serving to carry the material to be pressed;

laterally extending towing strips fixed to the front ends of said flexible transport strips, the ends of said towing strips projecting laterally beyond the side edges of the transport support and beyond the side edges of the press platens;

means on said feed basket for linearly moving each of said pallets with its respective flexible transport support carried thereon toward the corresponding press platen until the pallet abuts against the press platen, and their respective top surfaces form a smoothly faired, continuous surface;

driving means movable alongside said press platen and engageable with the laterally projecting ends of said towing strips to pull said transport support off of said pallet and onto the press platen.

2. The apparatus of claim 1, wherein said means on said feed basket comprises an actuating cylinder connected to the feed basket and having a piston rod connected to said pallet; said actuating cylinder retracting said pallet to its initial position when said transport support has been removed therefrom.

3. The apparatus of claim 1, wherein said driving means comprises an endless chain disposed along the side edge of the press platen; and a towing pin fixed to said chain and projecting upwardly therefrom to engage said towing strip.

4. The apparatus of claim 1, wherein the press platens have ramps on the entrance end thereof, said ramps being offset downwardly from the top surface of the press platen by a distance equal to the thickness of the said pallet, whereby when the front end of the pallet is resting on the ramp, the top surface of the pallet is flush with the top surface of the press platen.

5. The apparatus of claim 4, wherein said ramps comprise a plurality of laterally spaced, tapered projections, and said means on said feed basket comprises an actuating cylinder that is pivotally connected to the feed basket and has a piston rod connected to said pallet; said piston rod being extendable to push said pallet toward its respective press platen until the front edge of the pallet rests on said lugs; and said piston rod being retractable after the transport support has been removed, to return the pallet to its initial position.

* * * * *